United States Patent [19]

Tate

[11] 3,749,169

[45] July 31, 1973

[54] SECONDARY RECOVERY PROCESS

[75] Inventor: Jack F. Tate, Houston, Tex.

[73] Assignee: Texaco Inc., New York, N.Y.

[22] Filed: June 25, 1971

[21] Appl. No.: 157,050

Related U.S. Application Data

[63] Continuation-in-part of Ser. No. 82,187, Oct. 19, 1970, abandoned.

[52] U.S. Cl............. 166/271, 166/274, 252/8.55 D
[51] Int. Cl...................... E21b 43/22, E21b 43/27
[58] Field of Search................... 166/274, 275, 271, 166/307, 308; 252/8.55 C, 8.55 D; 260/88.3 L

[56] References Cited

UNITED STATES PATENTS

| | | | |
|---|---|---|---|
| 2,885,004 | 5/1959 | Perry | 166/271 X |
| 3,179,171 | 4/1965 | Beale, Jr. | 252/8.55 C |
| 3,141,501 | 7/1964 | Bernard et al. | 166/274 |
| 3,398,094 | 8/1968 | Blatz et al. | 166/275 |
| 3,434,971 | 3/1969 | Atkins | 166/307 X |
| 3,254,719 | 6/1966 | Root | 166/308 |
| 3,294,729 | 12/1966 | Hort et al. | 260/88.3 L X |
| 3,294,765 | 12/1966 | Hort et al. | 166/307 UX |

*Primary Examiner*—Stephen J. Novosad
*Attorney*—Thomas H. Whaley et al.

[57] ABSTRACT

Significant improvement in the recovery of hydrocarbons from a subterranean hydrocarbon-bearing calcareous formation is accomplished by injecting into the formation via an injection well drilled into a formation communicating with an adjacent producing well and containing acid-soluble components which may or may not have water-sensitive clays and shales included therein, an acidic aqueous polymer solution whereupon the acid solution reacts with the acid-soluble components of the formation creating passageways or enlarging existing passageways thus facilitating the flow of fluids therein and thereby increasing the recovery of hydrocarbons from the formation through the adjacent producing well.

18 Claims, No Drawings

3,749,169

SECONDARY RECOVERY PROCESS

CROSS REFERENCE TO COPENDING APPLICATION

This application is a continuation-in-part of commonly assigned application Ser. No. 82,187, filed Oct. 19, 1970, now abandoned.

FIELD OF THE INVENTION

This invention relates to a process for the recovery of hydrocarbons from subterranean hydrocarbon-bearing formations containing acid-soluble components in which the permeability and porosity of the formation communicating between the producing well and adjacent injection well are increased by treating with an acidic aqueous polymer solution thereby facilitating the flow of fluids through the formation resulting in increased hydrocarbon recovery via the production well.

DESCRIPTION OF THE PRIOR ART

In recovering oil from oil-bearing reservoirs it usually is possible to recover only a minor part of the original oil in place by the primary recovery methods which utilize the natural forces present in the reservoir. As a result, a variety of supplemental recovery techniques have been utilized to increase the recovery of oil from subterranean hydrocarbon-bearing reservoirs or formations. Although these supplemental techniques are commonly referred to as secondary recovery operations in fact they may be primary or tertiary in sequence of employment. In such techniques, a fluid is introduced into the formation in order to displace the oil therein to a suitable production system through which the oil may be withdrawn to the surface of the earth. Examples of displacing mediums include gas, aqueous liquids such as fresh water or brine, oil-miscible liquids such as butane, or a water and oil-miscible liquid such as an alcohol. Generally, the most promising of the secondary recovery techniques is concerned with the injection into the formation of an aqueous flooding medium either alone or in combination with other fluids.

In the application of these conventional procedures for the production of hydrocarbons from similar formations by the secondary recovery method of water-injection, one of the principal difficulties that has been encountered is the generally low production response realized because of the low permeabilities and the consequent low rate of water acceptance of the communicating formation. Thus, these unfavorably low responses both in injection rate and in overall production have led to the abandonment of hydrocarbon production by water-injection methods from many carbonate formations after only a minimal amount of the oil-in-place has been produced.

One of the remedial measures that has been used frequently to increase water-injectivity in carbonate formations is acid-treating of injection wells to improve the permeability surrounding the injection well bore, and thereby increasing the flow capabilities of the formation in the vicinity of the injection well bore. These measures, however, may result in only a temporary response in production improvement.

In acidizing an injection well utilizing the commonly employed procedure a non-oxidizing mineral acid, such as hydrochloric acid, sulphuric acid, etc. is introduced into the injection well, and through the application of sufficient pressure is forced into the adjacent formation, where it reacts with the acid-soluble components, particularly the carbonates to dissolve them, thereby increasing the permeability of the formation adjacent the bore of the injection well. Since these strong acids have almost instantaneous rates of reaction with carbonates, the acid, therefore, necessarily spends itself in the formation immediately adjacent the injection well bore so that little beneficial effect is realized at any great distance from the well bore within the formation under treatment. Also, the strong acids may cause channeling between injection and producing wells, cavitation and eventual collapse of the formation immediately adjacent the injection well bore due to excessively rapid action of the acid. Further, subsurface equipment may be damaged severely by strong acid attack.

One method suggested to overcome the above-mentioned disadvantages has been the use of "retarded" acids which consist of a mineral acid and an additive which emulsifies the acid, a combination of which affects the acidization rate. Although such emulsified mixtures can be displaced into the formation before substantial reaction occurs, such compositions have the inherent disadvantage in that when the emulsion breaks and they do react, they usually react swiftly, often unpredictably and without substantially resolving the problem of cavitation and channeling.

The primary object of the present invention is to provide a process for the improved recovery of fluids and especially hydrocarbons from subterranean fluid-bearing formations by providing a process wherein a composition comprising an acidic aqueous solution of a vinylpyrrolidone polymer is injected into a formation communicating between a producing well and an adjacent injection well, said formation containing acid-soluble components and in some instances also containing water-sensitive clays or shales, and whereafter the acid contained in the said composition reacts with the acid-soluble components of the formation to increase permeability and porosity of the formation thereby facilitating the flow of fluids therethrough.

SUMMARY OF THE INVENTION

In accordance with the present invention, there is provided a new and improved method for the recovery of hydrocarbons from subterranean hydrocarbon-bearing formations in which there is injected into the formation via an injection well drilled into a formation communicating with an adjacent producing well and containing acid-soluble components which may or may not have water-sensitive clays included therein, a composition comprising an acidic aqueous solution of a vinylpyrrolidone polymer which is capable of reacting with the acid-soluble components at a reduced rate and which, if clays or shales are present, is capable of diminishing imbibition of water by the clays or shale and thereby inhibiting plugging or other damage due to formation swelling, which acid thereof subsequently reacts with the acid-soluble components of the formation to increase the permeability and porosity thereof thereby permitting a substantial increase of production of hydrocarbons from the formation via the production well.

A number of advantages result in treating subterranean hydrocarbon-bearing formations having acid-soluble components therein with the acidic aqueous polymer-containing compositions of this invention, namely:

1. The reaction rate of the acid with the formation acid-solubles, such as carbonates or dolomites, is greatly lessened. One of the most serious problems encountered in the use of mineral acids as acidizing agents, as previously mentioned, is the very rapid rate with which they react with such acid-solubles in the formation with the result that the acid necessarily spends itself in the formation immediately adjacent the injection well bore so that little beneficial effect is realized at any great distance from the bore within the formation under treatment.

2. The post-precipitation of dissolved carbonates is prevented. Because of the nature of the dissolution reaction:

$$Ca(HCO_3)_2 \leftrightarrow CaCO_3 + H_2O + CO_2 \uparrow$$

when the pressure decreases a distance from the injection well bore and carbon dioxide breaks out of solution, or if carbon dioxide partitions into the oil phase, the solid calcium carbonate can reprecipitate within the formation, plugging capillaries and reducing permeability. Such an event can reduce injectivity and accordingly rate of production.

3. The viscosity of the displacing fluid is increased. The viscosities of oil present in subsurface geologic formations and its displacing fluid are important factors in the determination of the effectiveness with which oil is pushed through the pore space of said oil-bearing formation and the degree to which the oil is permitted to stick to formation surfaces (such as sand grains) to remain as residual oil. When the displacing fluid is lower in viscosity than the oil to be displaced, the high viscosity oil preferentially sticks to the walls of pore channels and permits the low viscosity displacing fluid to move ahead. Thus, low recoveries generally are obtained from reservoirs where oil viscosity is high.

4. The injection rate of the "polymer flood" is increased. The injection rate of a viscous polymer solution, though accomplishing the advantage cited in (3) is often greater than that of water flood, at the same pressure. Acidization in-depth accomplished during flooding greatly enhances the rate of injection.

5. The cited polymer is effective in preventing swelling of water-sensitive clays or shales and thus formation damage of this type during the flooding.

DESCRIPTION OF THE INVENTION

The method of the present invention in its broadest embodiment comprises introducing via an injection well drilled into a hydrocarbon-bearing formation containing acid-soluble components and communicating with a producing well a fluid composition comprising an acidic aqueous solution of a vinylpyrrolidone polymer in amounts sufficient to react with the formation so as to increase substantially the flow capability of the formation and to thereafter produce hydrocarbons from the said subterranean formation at an increased rate through the production well. The average molecular weight of the vinylpyrrolidone polymers utilized in the method of this invention generally will be from about 10,000 to about 1,000,000 or more and, preferably, from about 10,000 to about 400,000.

Highly advantageous results are realized in the recovery process of this invention when water-soluble vinylpyrrolidone polymers having recurring units of the formula:

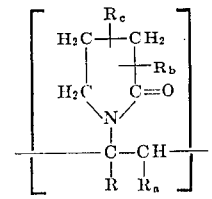

(1)

wherein R, $R_a$, $R_b$ and $R_c$ are independently selected from the group consisting of hydrogen and alkyl radicals having from one to five inclusive carbon atoms, are employed. Examples of alkyl radicals of one to five inclusive carbon atoms include methyl, ethyl, propyl, butyl, pentyl, and isomeric forms thereof. The sole limitation on the cited structure is that it be sufficiently soluble in the aqueous acid. Likewise, mixtures of these polymers may be employed. When R, $R_a$, $R_b$ and $R_c$ of Formula I above are each hydrogen, the resulting compound is polyvinylpyrrolidone, i.e., poly-N-vinyl-2-pyrrolidone, which is an especially useful polymer.

Preferably, the acidic aqueous treating composition of this invention injected into the hydrocarbon-bearing formation comprises an aqueous solution of about 3 to about 30 percent by weight of a non-oxidizing mineral acid, such as hydrochloric, sulfuric, etc., which contains dissolved therein between about 0.1 to about 10 percent by weight based on the total solution weight of the water-soluble vinylpyrrolidone polymer.

The vinylpyrrolidone polymers employed show a high degree of compatibility (i.e., no reaction) with inorganic salt solutions of compounds such as magnesium chloride, calcium chloride, barium chloride, sodium chloride, etc. As expected, the intrinsic viscosity increases with concentration and molecular weight (degree of polymerization). One of the unique characteristics of the cited polymer lies in the large increase in viscosity in aqueous acidic solutions thereof as the acidity is increased.

In preparing the vinylpyrrolidone polymers employed in the novel treating compositions of this invention, a carboxylic acid amide of the formula:

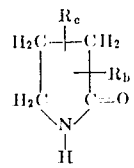

such as 2-pyrrolidone, 3-methyl-2-pyrrolidone, 4,4-diethyl-2-pyrrolidone, 5-isobutyl-2-pyrrolidone, 4-methyl-2-pyrrolidone, 3-ethyl-2-pyrrolidone, 3-methyl-5-ethyl-2-pyrrolidone, etc., is reacted with the acetylene or an acetylenic derivative of the formula:

$$RC \equiv CR_a$$

where R and $R_a$ have the same meaning as previously described under pressure at temperatures from about 130° to about 160° C and in the presence of the alkali metal salts of these acetylenic compounds as catalysts. This method is set forth in Kirk-Othmer, *Encyclopedia of Chemical Technology*, Second Edition, Vol I, Interscience Publishers, New York, 1963, page 205. The polymerization of the resulting vinyl derivatives can be carried out by methods well known in the art. The vinylpyrrolidone polymers are also sometimes referred to as polyethenylpyrrolidinones.

The acidic polymer solutions employed in the process of this invention, preferably contain an inhibitor to prevent or greatly reduce corrosion attack on metals. A variety of such inhibitors are known in the art, e.g., certain compounds of arsenic, nitrogen or sulfur as described by Grebe et al. in U.S. Pat. No. 1,877,504. Likewise, resinamine type inhibitors, as illustrated in U.S. Pat. No. 2,758,970, may be utilized. A small but effective amount of the inhibitor is employed which generally ranges from about 0.02 percent to about 1.5 percent by weight of the acidic aqueous polymer solution.

In the first step of preparing the acidic aqueous polymer composition of this invention, a solution containing from about 3 to about 30 percent by weight of a non-oxidizing mineral acid, such as hydrochloric acid, in water is prepared. An inhibitor to prevent corrosion on the metal equipment associated with the wells is usually added with mixing in the next step. The required amount of the polymer is then admixed with the aqueous acid solution employing a blender whereupon the polymer dissolves at a rather rapid rate.

The process of this invention can be carried out with a wide variety of injection and production systems which will comprise one or more wells penetrating the producing strata or formation. Such wells may be located and spaced in a variety of patterns which are well-known to those skilled in the art. For example, the so-called "line flood" pattern may be used, in which case the injection and producing systems are composed of rows of wells spaced from one another. The recovery zone, i.e., that portion of the producing formation from which hydrocarbons are displaced by the drive fluid to the production system, in this instance will be that part of the formation underlying the area between the spaced rows. Another pattern which is frequently used is the so-called "circular flood" in which the injection system comprises a central injection well while the production system comprises a plurality of production wells spaced about the injection well. Likewise, the injection and production systems each may consist of only a single well and here the recovery zone will be that part of the producing strata underlying an elliptical-like area between the two wells which is subject to the displacing action of the aqueous drive fluid. For a more elaborate description of such recovery patterns reference is made to Uren, L.C., *Petroleum Production Engineering-Oil Field Exploitation*, Second Edition, McGraw Hill Book Company, Inc., New York, 1939, and to U.S. Pat. Nos. 3,472,318 and 3,476,182.

In conducting the process of this invention, the acidic aqueous polymer solution prepared as described above is forced, usually via a suitable pumping system, down the well bore of an injection well and into the producing formation through which it is then displaced together with hydrocarbons of the formation in the direction of a production well.

The formation may be treated continuously with polymer solution or such treatment may be temporary. If desired, however, after a time, conventional flooding may be resumed, in which case injectivity is permanently increased due to acidization in depth and sweep efficiency is increased due to the increased viscosity. The acidic aqueous polymer solution of this invention also may be applied in a modified water flood operation in which there is first injected into the well bore a slug of the acidic aqueous polymer solution which is forced under pressure into the subterranean formation. This first step is then followed by a similar injection step wherein a slug of an aqueous drive fluid, such as water, is injected, which is thereafter followed by a repetition of the two steps. This sequence may be repeated to give a continuous cyclic process. The size of the slugs may be varied within rather wide limits and will depend on a number of conditions, including the thickness of the formation, its characteristics and the conditions for the subsequent injection of the aqueous drive medium.

It should be understood that the concentration of the polymer and the acid may be chosen to provide a displacing fluid of the desired rheological properties. Similarly, the appropriate molecular weight polymer is selected on the basis of the formation being treated as well as other operating conditions employed.

The following is a description of three series of laboratory tests whereby the effectiveness of the present invention has been shown.

In a first series of tests the reaction rate of a cylindrical Austin chalk core (2.2 cm. in length, 2.2 cm. in diameter) with solutions of 1 and 5 percent by weight solutions of polyvinylpyrrolidone of molecular weight 360,000, i.e., where R, $R_a$, $R_b$, and $R_c$ of Formula I are each a hydrogen atom, and intrinsic viscosity of 1.61 dissolved in a 15 percent by weight aqueous hydrochloric acid solution was determined. The results are summarized in the following Table A.

TABLE A

| Time (min.) | 15% HCl | ppm dissolved $CaCO_3$ 0.5% A* in 15% HCl | 1% A in 15% HCl |
|---|---|---|---|
| 1 | 27,600 | — | 500 |
| 2 | 43,400 | — | 500 |
| 3.58 | 58.780 | — | 3850 |
| 5.84 | 73,300 | 13,200 | 6780 |
| 8.33 | 79,180 | 19,020 | 10,000 |
| 10.0 | 79,480 | — | — |
| 11.6 | 79,990 | 24,780 | 13,210 |
| 13.3 | 80,980 | — | — |
| 15.8 | 82,480 | 30,000 | 16,500 |
| 20.0 | 83,100 | — | — |
| 21.6 | — | 41,100 | 21,620 |
| 30.0 | — | 51,500 | 28,820 |
| 41.6 | — | 65,100 | 38,600 |
| 58.4 | — | 77,900 | 51,000 |
| 83.4 | — | 88,900 | 64,100 |
| 116.5 | — | — | 77,600 |

*Additive A - polyvinylpyrrolidone having an average molecular weight of 360,000 and intrinsic viscosity of 1.61.

From the data presented in the above table, it is evident that the polyvinylpyrrolidone when dissolved in a mineral acid widely employed in acidizing procedures is effective in greatly reducing the rate of attack by said acid on a limestone or chalk formation.

Many polymeric materials hydrolyze or otherwise decompose in mineral acid over relatively short periods of time causing a simultaneous reduction in viscosity and effectiveness in water-flooding applications, etc. Therefore, in a second series of tests the viscosity of 0.5 and 1 percent by weight solutions of the same vinylpyrrolidone polymer employed in the first series of tests (i.e., Additive A), in 15 percent by weight hydrochloric acid was measured over a period of 28 days. The results are reported in Table B.

TABLE B

| Concentration of Additive (% in 15% HCl) Composition | Days Elapsed | Relative Viscosity | | |
|---|---|---|---|---|
| | | 0 | 0.5 | 1 |
| 15% HCl | — | 1.00 | — | — |
| Additive A in 15% HCl | 3 | — | 1.99 | 3.40 |
| Additive A in 15% HCl | 14 | — | 1.93 | 3.32 |
| Additive A in 15% HCl | 28 | — | 1.92 | 3.28 |

The above results indicate that little, if any, decomposition occurred over a period of 28 days.

In this third series of tests an Ostwald viscometer was used to measure the viscosity (relative to 15% HCl) of various solutions of the same vinylpyrrolidone polymer employed in the first series of tests (i.e., Additive A) in 15 percent by weight HCl at room temperature. The following table summarizes these results.

TABLE C

| Concentration of Additive (% in 15% HCl) Composition | Relative Viscosity | | | |
|---|---|---|---|---|
| | 0 | 0.5 | 1 | 5 |
| 15% HCl | 1.00 | — | — | — |
| Additive A in 15% HCl | — | 1.97 | 3.26 | — |
| Additive B in 15% HCl | — | — | — | 2.52 |

Additive B — polyvinylpyrrolidone having an average molecular weight of 40,000 and intrinsic viscosity of 0.225.

These data demonstrate that dissolution of the above polymers in 15 percent by weight hydrochloric acid produces a remarkable increase in viscosity.

EXAMPLE I

Through a water injection well drilled into a limestone formation there is displaced uner pressure down the tubing and into the formation an acidic aqueous polymer solution containing 1 percent by weight based on the total weight of the solution of polyvinylpyrrolidone of average molecular weight of 200,000 dissolved in a 4 percent by weight aqueous solution of hydrochloric acid. After about five days the production of hydrocarbons from an adjacent producing well is substantially increased over that obtained utilizing water as the drive fluid.

EXAMPLE II

A flooding operation is carried out in an oil-containing reservoir in accordance with the process of this invention. Four injection wells are arranged in a rectangular pattern around a single centrally located production well in this system. A slug consisting of 75 barrels of an acidic aqueous polymer solution containing 0.5 percent by weight based on the total weight of the solution of polyvinyl-pyrrolidone of average molecular weight of 360,000 dissolved in a 3 percent by weight aqueous solution of hydrochloric acid is displaced via each of the four injection wells into the formation at a rate of 50 bbl/day. In the next step, 100 barrels of water are injected under pressure into the producing formation through each injection well at a rate of about 55 bbl/day. This sequence of operations is repeated indefinitely and the result is an increased injection rate of the drive streams into the injection wells and simultaneously the production of hydrocarbons via the production well is significantly increased.

EXAMPLE III

An injection well drilled in La Fourche Parish, La., into a formation containing about 30% HCl soluble material was treated with 500 gallons of conventional 15% HCl followed by 1,500 gallons of 15% HCl containing 1 percent by weight of polyvinylpyrrolidone having a molecular weight of 360,000 and intrinsic viscosity of 1.61. The aqueous acidic polymer was displaced from the tubing into the formation with lease water and the well shut in for 24 hours. Before treatment, 850 bbl. water/day could be injected at a pressure of 1,500 psi. After treatment, 1,300 bbl. water/day could be injected at the diminished pressure of 300 psi. These same conditions prevailed 3 months after treatment. Treatment with the same volume of 15% HCl in the absence of polyvinylpyrrolidone resulted in temporary benefit but acidization had to be repeated in 25 days.

What is claimed is:

1. A process for recovering hydrocarbons from a hydrocarbon-bearing formation containing acid-soluble components having at least one injection well and at least one production well penetrating the said formation and in fluid communication, which comprises displacing through the formation a composition comprising an acidic aqueous polymer solution and recovering hydrocarbons through the production well, the said acidic aqueous polymer solution comprising a vinylpyrrolidone polymer dissolved in an aqueous solution of a non-oxidizing mineral acid.

2. The process of claim 1 wherein the said vinylpyrrolidone polymer comprises recurring units of the formula:

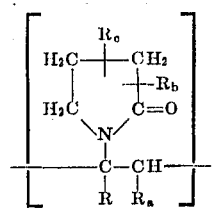

wherein $R$, $R_a$, $R_b$ and $R_c$ are independently selected from the group consisting of hydrogen and alkyl radicals having from one to five inclusive carbon atoms.

3. The process of claim 1 wherein the said acid is selected from the group consisting of hydrochloric and sulfuric acids.

4. The process of claim 1 wherein the said acid is hydrochloric acid.

5. The process of claim 1 wherein the said polymer is dissolved in about 3 to about 30 percent by weight aqueous solution of the mineral acid.

6. The process of claim 1 wherein the average molecular weight of the said polymer is from about 10,000 to about 1,000,000.

7. The process of claim 1 wherein the average molecular weight of the said polymer is from about 100,000 to about 400,000.

8. The process of claim 1 wherein the said polymer polyvinylpyrrolidone having an average molecular weight of from about 10,000 to about 1,000,000.

9. The process of claim 1 wherein the said acidic aqueous polymer solution comprises polyvinylpyrrolidone having an average molecular weight of about 10,000 to about 1,000,000 dissolved in about 3 to about 30 percent by weight aqueous hydrochloric acid solution.

10. The process of claim 1 wherein the said acidic aqueous polymer solution comprises about 0.1 to about 10 percent by weight of polyvinylpyrrolidone having an average molecular weight of about 100,000 to about 400,000, dissolved in about 3 to 10 percent by weight aqueous hydrochloric acid solution.

11. A process for recovering hydrocarbons from a hydrocarbon-bearing formation containing acid-soluble components and having at least one injection well and at least one production well penetrating the said formation in fluid communication, which comprises displacing through the formation a slug of a composition comprising an acidic aqueous polymer solution, thereafter injecting a slug of an aqueous drive fluid into the formation to drive the said polymer solution through said formation toward said production well and recovering hydrocarbons through the porduction well, the said acidic aqueous polymer solution comprising a vinyl-pyrrolidone polymer dissolved in an aqueous solution of a non-oxidizing mineral acid.

12. The process of claim 11 wherein the said vinyl-pyrrolidone polymer comprises recurring units of the formula

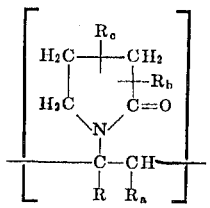

wherein R, $R_a$, $R_b$ and $R_c$ are independently selected from the group consisting of hydrogen and alkyl radicals having from one to five inclusive carbon atoms.

13. The process of claim 11 wherein the said acid is selected from the group consisting of hydrochloric and sulfuric acids.

14. The process of claim 11 wherein the said acid is hydrochloric acid.

15. The process of claim 11 wherein the average molecular weight of the said polymer is about 10,000 to about 1,000,000.

16. The process of claim 11 wherein the said polymer is polyvinylpyrrolidone having an average molecular weight of from about 10,000 to about 1,000,000.

17. The process of claim 11 wherein the said polymer is dissolved in about 3 to about 30 percent by weight aqueous solution of the mineral acid.

18. The process of claim 11 wherein the said acidic aqueous polymer solution comprises polyvinylpyrrolidone having an average molecular weight of about 10,000 to about 1,000,000 dissolved in about 3 to 30 percent by weight aqueous solution of hydrochloric acid.

* * * * *